(12) United States Patent
de Cuetos et al.

(10) Patent No.: US 6,754,373 B1
(45) Date of Patent: Jun. 22, 2004

(54) SYSTEM AND METHOD FOR MICROPHONE ACTIVATION USING VISUAL SPEECH CUES

(75) Inventors: Philippe de Cuetos, Allauch (FR);
Giridharan R. Iyengar, Mohegan Lake, NY (US); Chalapathy V. Neti, Yorktown Heights, NY (US);
Gerasimos Potamianos, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 671 days.

(21) Appl. No.: 09/616,229

(22) Filed: Jul. 14, 2000

(51) Int. Cl.[7] .............................. G06K 9/00; G10L 15/26
(52) U.S. Cl. ....................... 382/118; 382/190; 704/235; 704/271; 704/275
(58) Field of Search .................. 382/118, 190–208; 704/275, 235, 271

(56) References Cited

U.S. PATENT DOCUMENTS

| | | | | |
|---|---|---|---|---|
| 4,769,845 A | * | 9/1988 | Nakamura | 704/231 |
| 5,386,494 A | * | 1/1995 | White | 704/270.1 |
| 5,522,012 A | * | 5/1996 | Mammone et al. | 704/250 |
| 5,596,362 A | * | 1/1997 | Zhou | 348/14.01 |
| 5,625,704 A | * | 4/1997 | Prasad | 382/118 |
| 6,028,960 A | * | 2/2000 | Graf et al. | 382/203 |
| 6,195,459 B1 | * | 2/2001 | Zhu | 382/176 |
| 6,219,639 B1 | * | 4/2001 | Bakis et al. | 704/246 |
| 6,243,683 B1 | * | 6/2001 | Peters | 704/273 |
| 6,396,954 B1 | * | 5/2002 | Kondo | 382/224 |
| 6,504,944 B2 | * | 1/2003 | Mihara et al. | 382/118 |
| 6,690,815 B2 | * | 2/2004 | Mihara et al. | 382/118 |

OTHER PUBLICATIONS

Neti et al. "Audio–Visual Intent–to–Speak Detection for Human–Computer Interaction." Jun. 5, 2000. 2000 IEEE International Conference on Acoustics, Speech, and Signal Processing. Vol. 4. Pp. 2373–2376.*

Chen et al. "Audio–Visual Integration in Multimodal Communication." May 1998. Proceeding of the IEEE. Vol. 86. Pp. 837–852.*

Mark J. Shensa, "The Discrete Wavelet Transform: Wedding the A Trous and Mallat Algorithms," IEEE Transactions on Signal Processing, vol. 40, No. 10, pp. 2464–2482, Oct. 1992.

Bregler et al., "Eignelips for Robust Speech Recognition," IEEE Intl. Conf. Acoustics, Speech & Signal Proc. Conf., pp. 669–672, 1994.

* cited by examiner

*Primary Examiner*—Bhavesh M. Mehta
*Assistant Examiner*—Aaron Carter
(74) *Attorney, Agent, or Firm*—F. Chau & Associates, LLC; Thu A. Dang

(57) ABSTRACT

A system for activating a microphone based on visual speech cues, in accordance with the invention, includes a feature tracker coupled to an image acquisition device. The feature tracker tracks features in an image of a user. A region of interest extractor is coupled to the feature tracker. The region of interest extractor extracts a region of interest from the image of the user. A visual speech activity detector is coupled to the region of interest extractor and measures changes in the region of interest to determine if a visual speech cue has been generated by the user. A microphone is turned on by the visual speech activity detector when a visual speech cue has been determined by the visual speech activity detector. Methods for activating a microphone based on visual speech cues are also included.

32 Claims, 2 Drawing Sheets

SYSTEM AND METHOD FOR MICROPHONE ACTIVATION USING VISUAL SPEECH CUES

BACKGROUND OF THE INVENTION

1. Field of the Invention

The present invention relates to interactive communications systems, and more particularly to a system and method for activating a microphone based on visual speech cues.

2. Description of the Related Art

Advances in computer technology have made real-time speech recognition systems available. In turn, speech recognition systems have opened the way towards an intuitive and natural human-computer interaction (HCI). However, current HCI systems using speech recognition require a human to explicitly indicate their intent to speak by turning on a microphone using the key board or the mouse. This can be quite a hindrance in the natural interaction with information. One of the key aspects of naturalness of speech communication involves the ability of humans to detect an intent to speak by a combination of visual and auditory cues. Visual cues include physical proximity, eye contact, lip movement, etc.

Unfortunately, these visual auditory cues are difficult for computer systems to interpret. The naturalness of speech based interaction with computers can be dramatically improved by developing methods for automatic detection of speech onset/offset during speech-based interaction with information (open-microphone solutions). However, purely audio-based techniques suffer from sensitivity to background noise. Furthermore, audio-based techniques require clever buffering techniques since the onset of speech can be robustly detected only when the speech energy crosses a threshold.

Therefore, a need exists for a system and method for determining visual cues conveyed by a speaker and employing these visual cues to activate a microphone.

SUMMARY OF THE INVENTION

A system for activating a microphone based on visual speech cues, in accordance with the invention, includes a feature tracker coupled to an image acquisition device. The feature tracker tracks features in an image of a user. A region of interest extractor is coupled to the feature tracker. The region of interest extractor extracts a region of interest from the image of the user. A visual speech activity detector is coupled to the region of interest extractor and measures changes in the region of interest to determine if a visual speech cue has been generated by the user. A microphone is turned on by the visual speech activity detector when a visual speech cue has been determined by the visual speech activity detector.

Another system for activating a microphone based on visual speech cues, in accordance with the present invention, includes a camera for acquiring images of a user and an image difference operator coupled to the camera for receiving image data from the camera and detecting whether a change in the image has occurred. A feature tracker is coupled to the image difference operator, and the feature tracker is activated if a change in the image is detected by the image difference operator to track facial features in an image of a user. A region of interest extractor is coupled to the feature tracker and the image difference operator, and the region of interest extractor extracts a region of interest from the image of the user. A visual speech activity detector is coupled to the region of interest extractor for measuring changes in the region of interest to determine if a visual speech cue has been generated by the user. A microphone is included and turned on by the visual speech activity detector when a visual speech cue has been determined by the visual speech activity detector.

In alternate embodiments, the feature tracker may track facial features of the user, and the feature tracker may include a feature detector for detecting facial features of the user. The region of interest extractor may extract a mouth portion of the image of the user. The visual speech cue may include movement between successive images of one of a mouth region and eyelids of the user. The visual speech cue may be determined in image space of in feature space. The visual speech activity detector may include a threshold value such that the visual speech cue is determined by a standard deviation calculation between regions of interest in successive images which exceeds the threshold value. The visual speech activity detector may provide a feature vector describing the extracted region of interest and includes a classifier for classifying the feature vector as a visual speech cue. The feature vector may be determined by a discrete wavelet transform. The classifier may include a Guassian mixture model classifier. The system may further include an image difference operator coupled to the image acquisition device for receiving image data and detecting whether an image has changed. The system may include a microphone logic circuit for turning the microphone on when the visual speech cue is determined and turning the microphone off when no speech is determined.

A method for activating a microphone based on visual speech cues, includes the steps of: acquiring a current image of a face, updating face parameters when the current image of the face indicates a change from a previous image of the face, extracting a region of interest from the current image as dictated by the face parameters, computing visual speech activity based on the extracted region of interest, and activating a microphone for inputting speech when the visual speech activity has been determined.

In alternate methods, the step of updating face parameters may include the step of invoking a feature tracker to detect and track facial features of the user. The region of interest may include a mouth portion of the image of the user. The step of computing visual speech activity may include calculating movement between successive images of one of a mouth region and eyelids of the user. The visual speech activity may be computed in image space or feature space. The step of computing visual speech activity may include determining a standard deviation between regions of interest in the current image and the previous image, and comparing the standard deviation to a threshold valve such that if the threshold value is exceeded, visual speech activity is determined. The step of computing visual speech activity may includes determining a feature vector based on the region of interest in the current image, and classifying the feature vector to determine if visual speech activity is present. The feature vector may be determined by a discrete wavelet transform. The step of activating a microphone for inputting speech when the visual speech activity has been determined may includes marking an event when the visual speech activity is determined and activating the microphone in accordance with the event. A program storage device readable by machine, tangibly embodying a program of instructions executable by the machine may be employed to perform the above method steps.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention employs visual speech cues and the fact that visible articulation of speech precedes the audio-production of speech to robustly detect speech onset with minimal or no buffering in the presence of acoustic noise. This provides for a more robust natural language understanding speech recognition system, provides hands-free microphone control and thereby provides a more natural interaction environment with a computer system.

Figure 1:
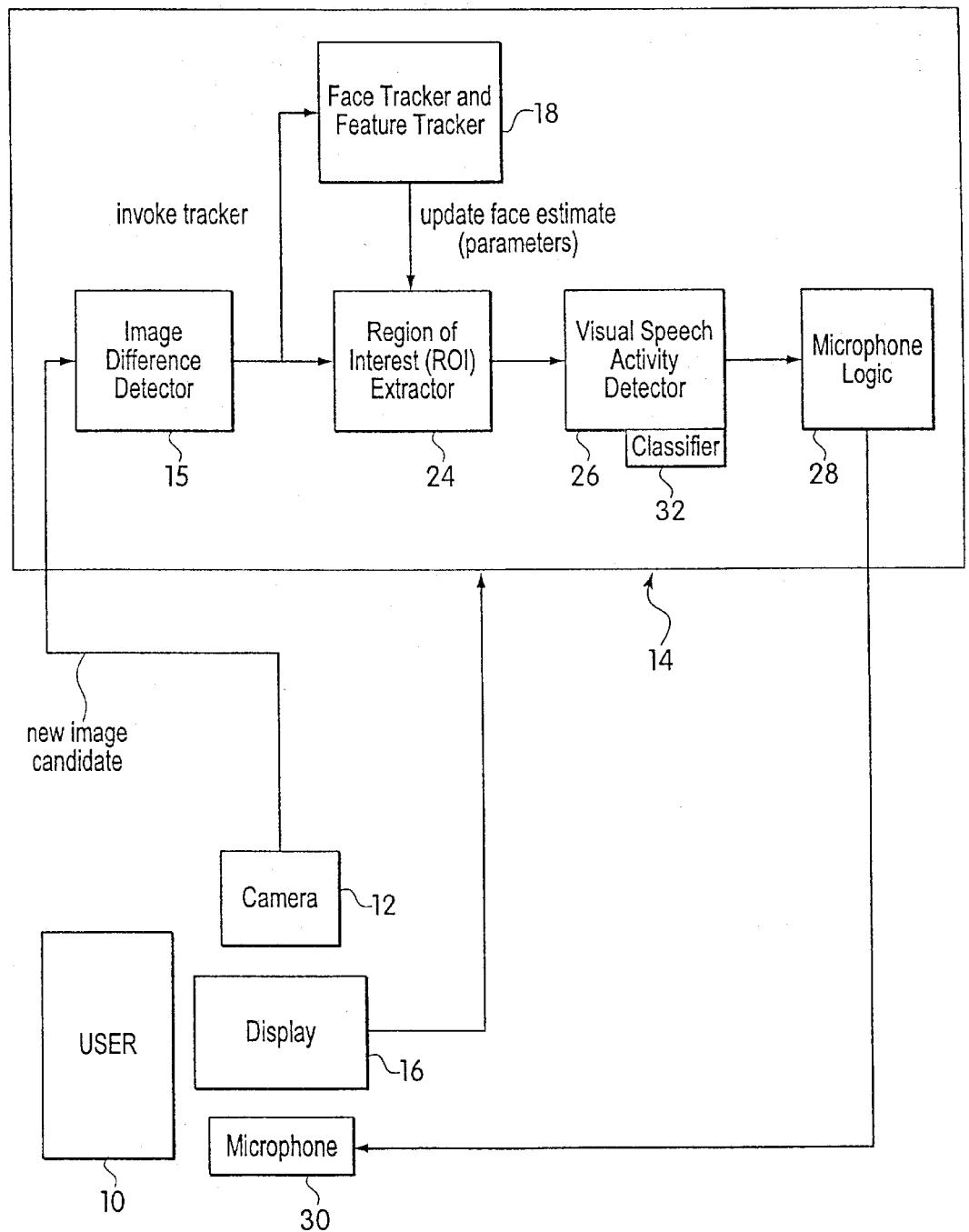
FIG. 1 is a block/flow diagram of a system/method for microphone activation based on visual speech cues in accordance with the present invention.
Figure 2:
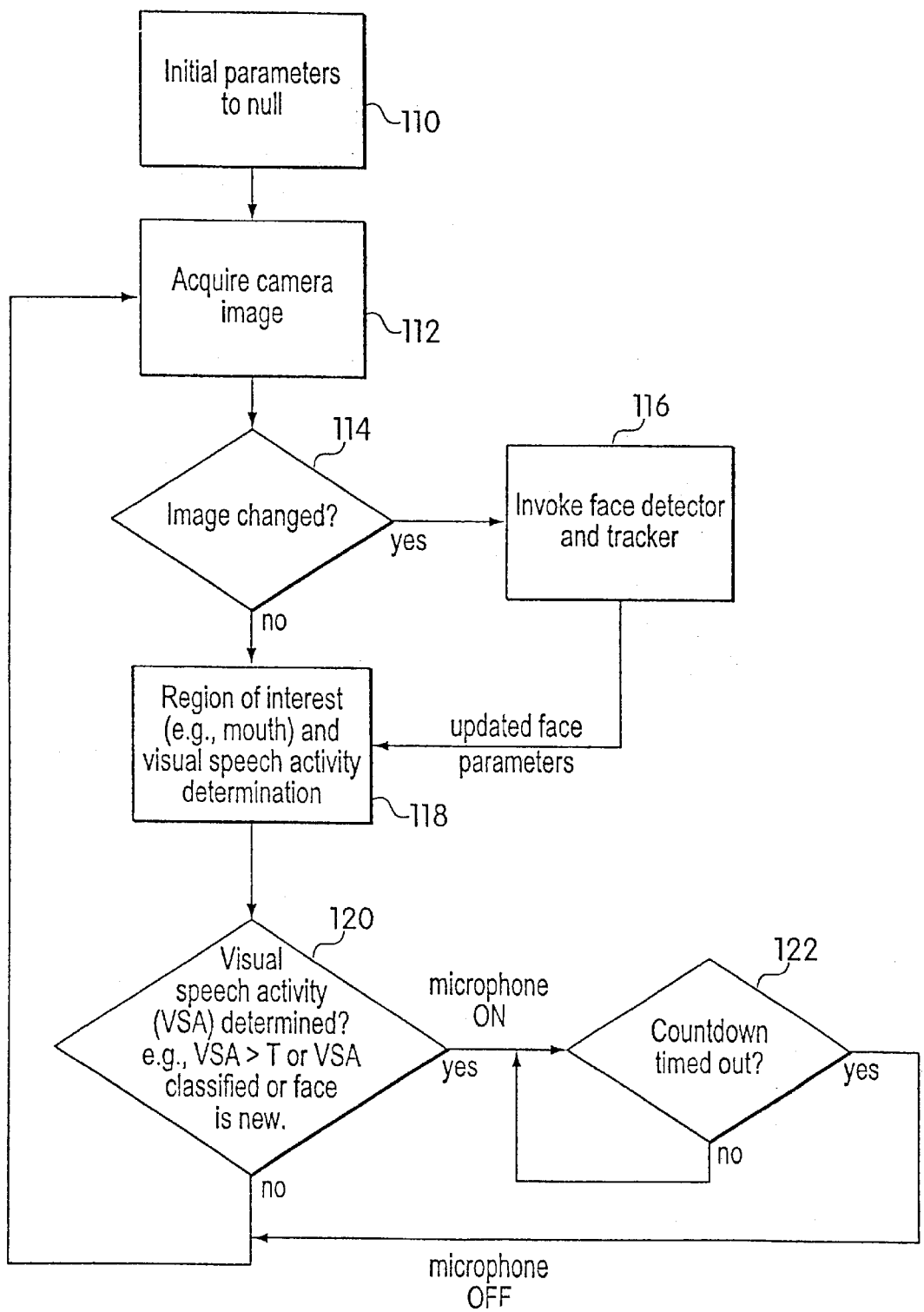
FIG. 2 is a flow diagram showing a method for microphone activation based on visual speech cues in accordance with the present invention.

It should be understood that the elements shown in FIGS. 1–2 may be implemented in various forms of hardware, software or combinations thereof. Preferably, these elements are implemented in software on one or more appropriately programmed general purpose digital computers having a processor and memory and input/output interfaces. Referring now to the drawings in which like numerals represent the same or similar elements and initially to FIG. 1, a block/flow diagram of an illustrative system/method for hands-free microphone manipulation is shown in accordance with the present invention. In the illustrative embodiment of FIG. 1, a user 10 is preferably disposed in front of a camera 12 of computer system 14 (e.g., frontality of pose (with respect to a display 16)) to permit detection of speech intent. It may be assumed that in many applications, speech is the input modality and visual display (on a display 16) is the output modality. In such a case, the user 10 looks at display 16 before she/he speaks.

Camera 12 captures an image of user 10. The image is preferably a digital pixel image, which is captured in accordance with an image difference operator 15. Image difference operator 15 is employed to compare the images to determine if there is a change in an image since a previous image was captured. Image difference operator 15 determines whether an image has changed enough to proceed with further processing, e.g., a new user is present, or a user has provided new activity.

If an image change is detected by detector 15, a face detector and feature tracker (face tracker) 18 is invoked. Face tracker 18 is invoked if an image change exceeds a preset threshold. If the preset threshold is exceeded, the new image is sent to face tracker 18. Face tracker 18 updates the face parameters if a face is detected. Otherwise, the face parameters are set to null. Face tracker 18 extracts features from the latest image (frontal pose) and returns a tracked face with features, such as, for example, eyes, mouth, nostrils, etc., located in the frontal face. Other features of the face or other body parts may also be employed, for example, hand movements or body language. Face tracker 18 provides an updated face estimate as an output in the form of a set of coordinates of the facial features of the user. This coordinate map may be employed to determine lines of symmetry between features or other points of reference against which movement in features may be tracked. The output may be in feature space.

A region of interest (ROI) extractor 24 is employed to extract, using the updated face estimate (from face tracker 18) and the image difference operator 15, a region of interest, such as, for example, an image of a mouth, tongue and/or teeth of user. The region of interest is preferably employed to determine visual speech cues, as will be described below.

Visual speech activity is present when speech intent is detected by employing the frontal pose. Visual speech activity is detected by a visual speech activity detector 26. This may be followed by detection of visual speech cues to indicate speech onset in acoustic degraded conditions (for instance, due to ambient noise).

In one embodiment, visual speech activity is measured by extracting the mouth region as a region of interest in visual ROI extractor 24 and using any of the following illustrative methods to represent variations in the mouth region due to speech (opening/closing of the lips, extent of visibility of the teeth and tongue).

In one method, when a frontal pose is detected by image difference operator 15, the system (region of interest extractor 24) extracts a bounding box image surrounding the estimated mouth location (referred henceforth as the mouth image). This mouth image is compared with the mouth image extracted from the preceding video frame, if one is available. When there is speech onset or ongoing speech, there is continuous change in the mouth shape and this change in shape can be used as an indicator of speech onset. The comparison between the two mouth images is performed either in the pixel space or in an appropriate feature space. In the pixel space, a difference image between the two mouth images is computed and the standard deviation of this difference image is estimated. The calculation of the standard deviation may be performed using techniques known in the art. This standard deviation is used as a measure of energy in the difference image. Other measures may also be employed. In this example, whenever the standard deviation of the difference image exceeds a preset threshold, the event is marked by detector 26 and a countdown timer is reset. This event marking is used to turn a microphone 30 on, through microphone logic 28, and enable speech recognition. The countdown timer is used to turn the microphone off once the speech terminates. If speech continues, however, new markings will continually reset the countdown timer to continue enablement of microphone 30. Microphone logic 28 may include a logic gate(s) or switches (not shown) which are employed to enable power on of microphone 30 in accordance with an event marker signal.

Since both the onset and ongoing speech activity cause the standard deviation to exceed the threshold, this mechanism is sufficient to detect both phenomena.

In feature (vector) space, the extracted mouth images are transformed from the two frames under consideration in feature space. Once the images are transformed to the feature space (feature vector space), the standard deviation of the difference image is estimated as before. The main advantage of using a feature space representation is that it permits operation in a smaller dimension and therefore results in computational efficiency.

In another method, given the mouth as the region of interest (ROI) extracted once a frontal pose is detected, the system uses an image compression transform (e.g., a discrete wavelet transform (DWT)) to obtain a low-dimensional representation of the data in an image transformed domain. DWTs which may be useful are described in M. Shesna, "The Discrete Wavelet Transform: Wedding the A Trous and Mallat Algorithms", IEEE Transactions on Signal Processing, Vol. 40, No. 10, October 1992, pp. 2464–2482. In one embodiment, the system keeps a number of highest energy (as calculated on a training set) discrete wavelet coefficients, say 18, on the two-dimensional ROI lattice, thus obtaining significant ROI compression. The retained wavelet coefficients, augmented by their first and second order temporal derivatives give rise to a dimensional feature vector (say, 54 dimensions) that captures static and dynamic information about the speech activity of the mouth ROI. For example, assume that a ROI image includes 45 by 30 pixels (=1350 pixels). Using DWT and its first and second derivatives, the POI image can be compactly represent this information using 8 by 3=54 numbers. This feature vector is then used by a 2-class Gaussian mixture model (GMM) classifier 32 to indicate whether the video frame of interest corresponds to a speech, or non-speech segment. Both DWT based feature extraction and GMM-based classification are extremely computationally efficient.

Advantageously, the present invention takes advantage of the precedence of visual speech articulation to the audio production of speech to indicate speech onset without the need for buffering. It has been established that the visual articulation of speech precedes the audio production by about 120 ms. See C. Bregler and Y. Konig, "'Eigenlips' for Robust Speech Recognition," IEEE Intl. Conf. Acoustics, Speech and Signal Proc. Conf., pp. 669–672, 1994. In accordance with the present invention, the time at which the above measure of visual speech activity crosses a threshold is e.g., 120 ms) is employed to turn the microphone on and send the audio to the speech recognizer without affecting speech recognition performance.

In accordance with the invention, pre-attentive visual cues are used to achieve computational efficiency. Since face detection and tracking is a computationally expensive operation, the face tracking subsystem is called only if the change in the incoming image from the camera exceeds a threshold value. This change detection is used both when there is a person in front of the camera 12 and when there is no one in front of camera 12. If there is no person in front of the camera 12 and since the background is assumed to be stationary with the exception of noise, a simple image difference operation by operator 15 is sufficient to indicate that nothing has changed in the visual field of the camera. When a person comes in front of the camera 12, this condition is violated and the face detection and tracking subsystem 18 is invoked. Similarly, when a person is in front of the camera and does not move much, the location of the detected facial features are within acceptable error tolerances. Therefore, difference operator 15 can once again be used to determine if the face tracker 18 is needed to recompute the facial feature locations.

Referring to FIG. 2, a block/flow diagram for hands-free microphone activation is shown in accordance with the present invention. The system preferably includes a computer with appropriately programmed software and includes hardware for interfacing with the computer. Hardware includes an attached camera 12, preferably facing outward from a display monitor 16 (See FIG. 1).

In block 110, face parameters are initialized to null before acquiring a first image. Then, an image is acquired in block 112 by employing the camera 12 (FIG. 1). The image preferably includes a human user, although other images may be employed. For example, in one embodiment, the system of the present invention may be employed with a television or display monitor as the subject of the image. In this way the present invention may be employed to activate a microphone, based on an image displayed on another monitor. In other words, the camera of the system may be set up to view a monitor, and the monitor may produce an image of a person talking with, for example, audio accompaniment.

In block 114, if the current image has changed from a previously taken image, a face tracker/detector 18 (FIG. 1) is called in block 116 to update features, if no past face or a last past tracked face is not, available. Otherwise, a previously imaged face is tracked. If the image is not changed, proceed to block 118 and retain past face parameters.

In block 116, if a frontal face is detected and has changed, the face parameters are updated. Otherwise, the face parameters are set to their past or previous values and these past face parameters are relied upon for future image acquisition comparisons. If face parameters are not null (i.e., have been updated), a region-of-interest (ROI) is extracted from the image as dictated by the face parameters, in block 118.

In block 118, visual speech activity (VSA) is computed. VSA may be computed by one of the methods described above, for example, the DWT based feature extraction and GMM-based classification in feature space, or standard deviation calculations in pixel or feature space. Block 118 calculates VSA of the extracted ROI in each iteration.

In block 120, if in this iteration, VSA is greater than a threshold value or VSA is otherwise classified as a visual speech cue, then the microphone is turned ON. Otherwise, the microphone is turned or remains OFF. In block 122, if a countdown timer expires the microphone is turned OFF, otherwise the microphone remains ON. If the microphone is turned OFF, return to block 112.

Having described preferred embodiments of a system and method for microphone activation using visual speech cues (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A system for activating a microphone based on visual speech cues, comprising, a feature tracker coupled to an image acquisition device, the feature tracker for tracking features in an image of a user;

a region of interest extractor coupled to the feature tracker, the region of interest extractor for extracting a region of interest from the image of the user, wherein the region of interest comprises a mouth portion of the image of the user;

a visual speech activity detector coupled to the region of interest extractor for measuring changes in the region of interest to determine if a visual speech cue has been generated by the user; and a microphone turned on by the visual speech activity detector when a visual speech cue has been determined by the visual speech activity detector.

2. The system as recited in claim 1, wherein the feature tracker tracks facial features of the user, the feature tracker including a feature detector for detecting facial features of the user.

3. The system as recited in claim 1, wherein the visual speech cue includes movement between successive images of one of a mouth region and eyelids of the user.

4. The system as recited in claim 1, wherein the visual speech cue is determined in image space.

5. The system as recited in claim 1, wherein the visual speech activity detector includes a threshold value such that the visual speech cue is determined by a standard deviation calculation between regions of interest in successive images which exceeds the threshold value.

6. The system as recited in claim 1, wherein the visual speech cue is determined in feature vector space.

7. The system as recited in claim 1, wherein the visual speech activity detector provides a feature vector describing the extracted region of interest and includes a classifier for classifying the feature vector as a visual speech cue.

8. The system as recited in claim 7, wherein the feature vector is determined by a discrete wavelet transform.

9. The system as recited in claim 7, wherein the classifier includes a Guassian mixture model classifier.

10. The system as recited in claim 1, further comprising an image difference operator coupled to the image acquisition device for receiving image data and detecting whether an image has changed.

11. A system for activating a microphone based on visual speech cues, comprising, a camera for acquiring images of a user;

an image difference operator coupled to the camera for receiving image data from the camera and detecting whether a change in the image has occurred;

a feature tracker coupled to the image difference operator, the feature tracker being activated if a change in the image is detected by the image difference operator to track facial features in an image of a user;

a region of interest extractor coupled to the feature tracker and the image difference operator, the region of interest extractor for extracting a region of interest from the image of the user;

a visual speech activity detector coupled to the region of interest extractor for measuring changes in the region of interest to determine if a visual speech cue has been generated by the user; and a microphone turned on by the visual speech activity detector when a visual speech cue has been determined by the visual speech activity detector.

12. The system as recited in claim 11, wherein the feature tracker tracks facial features of the user, the feature tracker including a feature detector for detecting facial features of the user.

13. The system as recited in claim 11, wherein the region of interest extractor extracts a mouth portion of the image of the user.

14. The system as recited in claim 11, wherein the visual speech cue includes movement between successive images of one of a mouth region and eyelids of the user.

15. The system as recited in claim 11, wherein the visual speech cue is determined in image space.

16. The system as recited in claim 11, wherein the visual speech activity detector includes a threshold value such that the visual speech cue is determined by a standard deviation calculation between regions of interest in successive images which exceeds the threshhold value.

17. The system as recited in claim 11, wherein the visual speech cue is determined in feature vector space.

18. The system as recited in claim 11, wherein the visual speech activity detector provides a feature vector describing the extracted region of interest and includes a classifier for classifying the feature vector as a visual speech cue.

19. The system as recited in claim 18, wherein the feature vector is determined by a discrete wavelet transform.

20. The system as recited in claim 18, wherein the classifier includes a Guassian mixture model classifier.

21. The system as recited in claim 11, further comprising a microphone logic circuit for turning the microphone on when the visual speech cue is determined and turning the microphone off when no speech is determined.

22. A method for activating a microphone based on visual speech cues, comprising the steps of:

acquiring a current image of a face;

updating face parameters when the current image of the face indicates a change from a previous image of the face;

extracting a region of interest from the current image as dictated by the face parameters;

computing visual speech activity based on the extracted region of interest; and activating a microphone for inputting speech when the visual speech activity has been determined.

23. The method as recited in claim 22, wherein the step of updating face parameters includes the step of invoking a feature tracker to detect and track facial features of the user.

24. The method as recited in claim 22, wherein the region of interest includes a mouth portion of the image of the user.

25. The method as recited in claim 22, wherein the step of computing visual speech activity includes calculating movement between successive images of one of a mouth region and eyelids of the user.

26. The method as recited in claim 22, wherein the visual speech activity is computed in image space.

27. The method as recited in claim 22, wherein the step of computing visual speech activity includes:

determining a standard deviation between regions of interest in the current image and the previous image; and comparing the standard deviation to a threshold valve such that if the threshold value is exceeded, visual speech activity is determined.

28. The method as recited in claim 22, wherein the visual speech activity is computed in feature vector space.

29. The method as recited in claim 22, wherein the step of computing visual speech activity includes:

determining a feature vector based on the region of interest in the current image; and classifying the feature vector to determine if visual speech activity is present.

30. The method as recited in claim 29, wherein the feature vector is determined by a discrete wavelet transform.

31. The method as recited in claim 22, wherein the step of activating a microphone for inputting speech when the visual speech activity has been determined includes:

marking an event when the visual speech activity is determined; and activating the microphone in accordance with the event.

32. A program storage device readable by machine, tangibly embodying a program of instructions executable by the machine to perform method steps as recited in claim 22.

* * * * *